(12) United States Patent
Wang

(10) Patent No.: US 12,242,166 B2
(45) Date of Patent: Mar. 4, 2025

(54) FRESNEL LIQUID CRYSTAL LENS STRUCTURE AND DISPLAY DEVICE

(71) Applicant: BOE Technology Group Co., Ltd., Beijing (CN)

(72) Inventor: Haiyan Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 199 days.

(21) Appl. No.: 17/770,256

(22) PCT Filed: Mar. 10, 2021

(86) PCT No.: PCT/CN2021/079852
§ 371 (c)(1),
(2) Date: Apr. 19, 2022

(87) PCT Pub. No.: WO2021/196998
PCT Pub. Date: Oct. 7, 2021

(65) Prior Publication Data
US 2022/0365401 A1 Nov. 17, 2022

(30) Foreign Application Priority Data

Apr. 1, 2020 (CN) .......................... 202010249520.1

(51) Int. Cl.
G02F 1/29 (2006.01)
(52) U.S. Cl.
CPC ............ *G02F 1/29* (2013.01); *G02F 2201/12* (2013.01)
(58) Field of Classification Search
CPC ....... G02F 1/29; G02F 2201/12; G02F 1/1343
(Continued)

(56) References Cited

U.S. PATENT DOCUMENTS

| 4,909,626 A | 3/1990 | Purvis et al. |
| 2010/0245743 A1* | 9/2010 | Yokoyama ............... G02B 3/14 349/117 |

(Continued)

FOREIGN PATENT DOCUMENTS

| CN | 101194198 A | 6/2008 |
| CN | 101889240 A | 11/2010 |

(Continued)

OTHER PUBLICATIONS

CN 202010249520.1 first office action.
(Continued)

*Primary Examiner* — Charles S Chang
(74) *Attorney, Agent, or Firm* — IPro, PLLC

(57) ABSTRACT

A Fresnel liquid crystal lens structure includes a first substrate and a second substrate arranged oppositely, a first electrode, a second electrode, and a liquid crystal layer located therebetween, wherein the first electrode is a plate-shaped electrode, the second electrode includes concentric ring electrodes; concentric ring electrodes are divided into electrode groups in a first direction to divide the formed Fresnel liquid crystal lens into lens regions; each electrode group is divided into sub-electrode groups arranged periodically in a first direction to divide each lens region into sub-lens regions arranged periodically; and each sub-electrode group includes electrodes to form a sub-lens region having a step shape and the quantity of electrodes in a sub-electrode group within a different electrode set is different. A display device including the Fresnel liquid crystal lens structure and a method for driving a Fresnel liquid crystal lens are also provided.

20 Claims, 8 Drawing Sheets

(58) Field of Classification Search
USPC .......................................... 349/13, 95, 200
See application file for complete search history.

(56) References Cited

U.S. PATENT DOCUMENTS

| | | | |
|---|---|---|---|
| 2011/0228181 A1 | 9/2011 | Jeong et al. | |
| 2015/0109269 A1* | 4/2015 | Sung .................... | H04N 13/305 |
| | | | 345/206 |
| 2015/0168756 A1 | 6/2015 | Cho et al. | |
| 2015/0219970 A1 | 8/2015 | Liu et al. | |
| 2015/0261001 A1 | 9/2015 | Jeong et al. | |
| 2015/0312562 A1 | 10/2015 | Kim et al. | |
| 2016/0202489 A1 | 7/2016 | Seo et al. | |
| 2019/0155096 A1 | 5/2019 | Gao et al. | |
| 2019/0187339 A1 | 6/2019 | Shibuya et al. | |
| 2021/0405394 A1 | 12/2021 | Li et al. | |

FOREIGN PATENT DOCUMENTS

| | | |
|---|---|---|
| CN | 102193202 A | 9/2011 |
| CN | 102692781 A | 9/2012 |
| CN | 102736352 A | 10/2012 |
| CN | 103488021 A | 1/2014 |
| CN | 105045001 A | 11/2015 |
| CN | 205992098 U | 3/2017 |
| CN | 107219573 A | 9/2017 |
| CN | 108037598 A | 5/2018 |
| CN | 109791317 A | 5/2019 |
| CN | 110286529 A | 9/2019 |
| CN | 111308805 A | 6/2020 |
| EP | 3076234 A1 | 10/2016 |
| JP | 2006079669 A | 3/2006 |
| JP | 2006145957 A | 6/2006 |
| JP | 2012123041 A | 6/2012 |

OTHER PUBLICATIONS

CN 202010249520.1 second office action.
PCT/CN2021/079852 international search report and written opinion.

* cited by examiner

FRESNEL LIQUID CRYSTAL LENS STRUCTURE AND DISPLAY DEVICE

CROSS-REFERENCE TO RELATED APPLICATIONS

This application is the U.S. national phase of PCT Application No. PCT/CN2021/079852 filed on Mar. 10, 2021, which claims priority to Chinese Patent Application No. 202010249520.1 filed in China on Apr. 1, 2020, the entire contents of which are hereby incorporated by reference.

This application claims priority to Chinese Patent Application No. 202010249520.1 filed in China on Apr. 1, 2020, the entire contents of which are hereby incorporated by reference.

TECHNICAL FIELD

The present disclosure relates to the technical field of manufacturing liquid crystal products, and particularly to a Fresnel liquid crystal lens structure and a display device.

BACKGROUND

Fresnel lens, also known as threaded lens, is typically made of polyolefin material by injection molding into a thin sheet, also made of glass. One surface of the lens is a smooth surface, the other surface of the lens is engraved with small to large concentric circles, and the width between adjacent concentric circles gradually decreases from the center to the edge. Its texture is designed according to the interference and diffraction of light and the requirements of relative sensitivity and receiving angle. A phase retardation curve of an ideal Fresnel lens is simulated by using a Fresnel liquid crystal lens. The Fresnel liquid crystal lens, which generally includes a first substrate and a second substrate which are oppositely arranged, and a liquid crystal layer, a first electrode, and a second electrode which are located between the first substrate and the second substrate, wherein the first electrode or the second electrode is a plurality of concentric ring electrodes; the liquid crystal layer is divided into multiple regions; for one region, different voltages are applied to the concentric ring electrodes at different positions corresponding to the region, so that the liquid crystals of the region deflect at different angles to form a lens region of the Fresnel liquid crystal lens; each lens region includes a step structure corresponding to a concentric ring electrode corresponding to the region on a one-to-one basis; the smaller the quantity of steps, the lower the efficiency of fitting an ideal Fresnel lens morphology, and the lower the available light efficiency; according to the lens region of the Fresnel liquid crystal lens, the concentric ring electrodes are divided into a plurality of electrode groups; then from the center to the edge, the width of the electrode groups gradually decreases; and since the line width of the electrode is limited and cannot be infinitely small, the quantity of steps of each lens region of the Fresnel liquid crystal lens is limited, i.e., the light efficiency utilization rate is low.

SUMMARY

In order to solve the above-mentioned technical problems, the present disclosure provides a Fresnel liquid crystal lens structure and a display device, which solve the problem of low light efficiency of the Fresnel liquid crystal lens.

In order to achieve the above-mentioned object, the present disclosure provides in some embodiments a first substrate, a second substrate, a first electrode, a second electrode, and a liquid crystal layer, wherein the first substrate and the second substrate are arranged opposite to each other, and the first electrode, the second electrode, and the liquid crystal layer are located between the first substrate and the second substrate, the first electrode is a plate-shaped electrode, the second electrode is a plurality of concentric ring electrodes, and a pre-set voltage is applied to the first electrode and the second electrode to deflect liquid crystals to form a Fresnel liquid crystal lens;

the plurality of concentric ring electrodes is divided into a plurality of electrode groups in a first direction, to divide the formed Fresnel liquid crystal lens into a plurality of lens regions;

each of the electrode groups is divided in the first direction into a plurality of sub-electrode groups arranged periodically, to divide each of the lens regions into a plurality of sub-lens regions arranged periodically; and each of the sub-electrode groups includes a plurality of electrodes, to form a sub-lens region having a step topography, and a respective quantity of electrodes in each of the sub-electrode groups located in any one of the electrode groups is different, to enable that a respective quantity of steps in each of the sub-lens regions located in any one of the lens regions is different;

wherein the first direction is a direction from a center to an edge of the plurality of concentric ring electrodes.

Optionally, a respective width of each of the electrode groups in the first direction gradually increases in the first direction.

Optionally, the respective quantity of electrodes in each of the sub-electrode groups located in the electrode group gradually decreases in the first direction.

Optionally, the plurality of electrode groups include a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further includes a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage.

Optionally, the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_{k*m}$.

Optionally, an end of each of the leads that is adjacent to the center of the concentric ring electrodes is connected to the respective electrode in the sub-electrode group.

Optionally, the quantity of electrodes in the sub-electrode groups of the electrode group that is located at the center of the concentric ring electrodes is a maximum quantity of electrodes that is capable of satisfying a preset aperture ratio.

Optionally, the quantity of electrodes in the sub-electrode groups of the electrode group that is located at the edge of the plurality of concentric ring electrodes is greater than or equal to a minimum quantity of electrodes that is capable of forming the Fresnel liquid crystal lens topography.

Optionally, the quantity of electrodes in each of the sub-electrode groups of the same electrode group is same.

Optionally, a width of each of the electrodes in the same sub-electrode group is same, and the respective widths of the electrodes in different sub-electrode groups in the same electrode group gradually decreases in the first direction.

The present disclosure further provides in some embodiments a display device including the Fresnel liquid crystal lens structure described above.

The present disclosure further provides in some embodiments a method for driving the Fresnel liquid crystal lens, wherein a Fresnel liquid crystal lens structure includes a first substrate, a second substrate, a first electrode, a second electrode, and a liquid crystal layer, wherein the first substrate and the second substrate are arranged opposite to each other, and the first electrode, the second electrode, and the liquid crystal layer are located between the first substrate and the second substrate, the first electrode is a plate-shaped electrode, the second electrode is a plurality of concentric ring electrodes, and a pre-set voltage is applied to the first electrode and the second electrode to deflect liquid crystals to form the Fresnel liquid crystal lens; the plurality of concentric ring electrodes is divided into a plurality of electrode groups in a first direction, to divide the formed Fresnel liquid crystal lens into a plurality of lens regions; each of the electrode groups is divided in the first direction into a plurality of sub-electrode groups arranged periodically, to divide each of the lens regions into a plurality of sub-lens regions arranged periodically; and each of the sub-electrode groups includes a plurality of electrodes, to form a sub-lens region having a step shape, and a respective quantity of electrodes in each of the sub-electrode groups located in any one of the electrode groups is different, to enable that a respective quantity of steps in each of the sub-lens regions located in any one of the lens regions is different; wherein the first direction is a direction from a center to an edge of the plurality of concentric ring electrodes;

the method includes: providing the plurality of electrodes in each of the sub-electrode groups with respective different voltages, to deflect the liquid crystals at different angles to form the sub-lens region having the step shape.

Optionally, the plurality of electrode groups include a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further includes a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage;

wherein the method further includes: providing, through the first leads, the plurality of electrodes in the first sub-electrode group with respective different voltages, and providing, through the second leads, the plurality of electrodes in the second sub-electrode group with voltages that are same as the voltages at the first leads arranged at the preset positions, respectively.

Optionally, the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_{k*m}$, wherein providing, through the second leads, the plurality of electrodes in the second sub-electrode group with the voltages that are same as the voltages at the first leads arranged at the preset positions, respectively, includes:

providing, through the $k^{th}$ second lead, the electrode that is in the second sub-electrode group and numbered as $b_k$ with the same voltage as the voltage at the $(k*m)^{th}$ first lead.

DETAILED DESCRIPTION

Figure 1:
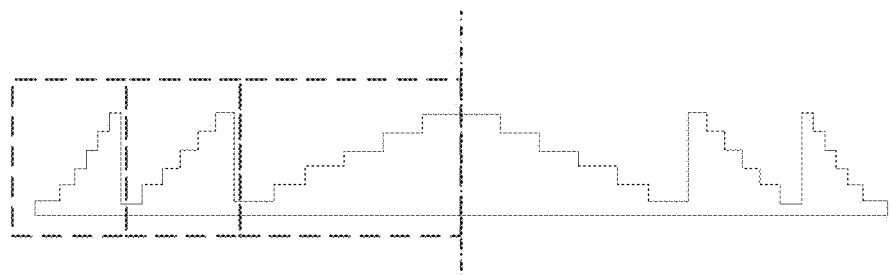
FIG. 1 is a schematic view of a Fresnel lens structure.

To further clarify the objectives, features and advantages of the embodiments of the present disclosure, the technical solutions in the embodiments of the present disclosure will be clearly and completely described below in combination with the drawings in the present disclosure. It is apparent that the described embodiments are not all embodiments but part of embodiments of the present disclosure. Based on the embodiments in the present disclosure, all other embodiments obtained by a person of ordinary skill in the art without inventive effort are within the scope of protection of this disclosure.

In the description of the present disclosure, it should be understood that the orientation or positional relationship indicated by the terms "center", "upper", "lower", "front", "rear", "left", "right", "vertical", "horizontal", "top", "bottom", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure. The terms "first", "second" and "third" are used for descriptive purposes only and are not to be construed as indicating or implying relative importance.

The electrode forming the Fresnel liquid crystal lens is composed of a series of concentric circular ring arranged periodically, wherein each period is a sawtooth structure, as shown in FIG. 1, one sawtooth structure in each dotted box is a respective one period, and the period width is calculated according to a calculation formula derived from the Fraunhofer diffraction theory: $r_j=\sqrt{jf\lambda}$ $d_j=r_j-r_{j-1}$ (the width of each ring is determined by designed target focal length and wavelength), where $r_j$ is the distance from the boundary far from the center of the current period to the center, $r_{j-1}$ is the distance from the boundary adjacent to the center of the current period to the center, j represents the $j^{th}$ period arranged from the center to the edge, and f represents the focal length. The width of the resulting set of concentric ring electrodes corresponding to each period gradually decreases from the center to the edge.

Figure 2:
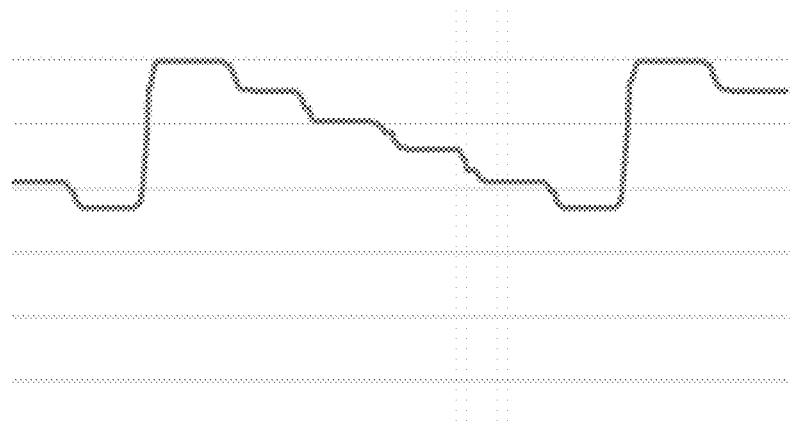
FIG. 2 is a part of morphology of a Fresnel liquid crystal lens with a six-step shape.

The Fresnel liquid crystal lens with a periodic change is formed by controlling the deflection of the liquid crystals at different positions by applying different voltages, and a six-step equivalent Fresnel lens is formed by correspondingly applying six electrodes with different voltages in each period, as shown in FIGS. 1 and 2, wherein FIG. 1 is an ideal morphology of the Fresnel liquid crystal lens, FIG. 2 is an actual simulated morphology of the Fresnel liquid crystal lens part formed by six different voltages, and examples of voltages applied by one six-electrode are: 0V, 1.77V, 1.89V, 2.16V, 2.28V, and 2.72V, which increases from the highest position of the step to the lowest position of the step, and controls the deflection of the liquid crystals at different positions, so as to enable the refractive index to gradually reduce at different positions and realize an equivalent six-step Fresnel lens structure.

The six-step is designed for the following reasons: the electrodes are multiple concentric ring electrodes. According to the Fresnel periodic line width design method, the width of the electrode group corresponding to the period of the Fresnel lens gradually decreases from the center to the edge. Therefore, due to the limitation of the current process line width (the minimum electrode line width is 3.92 microns), only the six-step design may be implemented if the lens performance parameter requirements of the focal length of 350 mm and the aperture of 16.7 mm is required.

Figure 3:
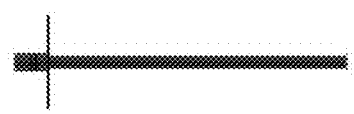
FIG. 3 is an optical simulation result 1 of a Fresnel liquid crystal lens with a six-step shape.
Figure 4:
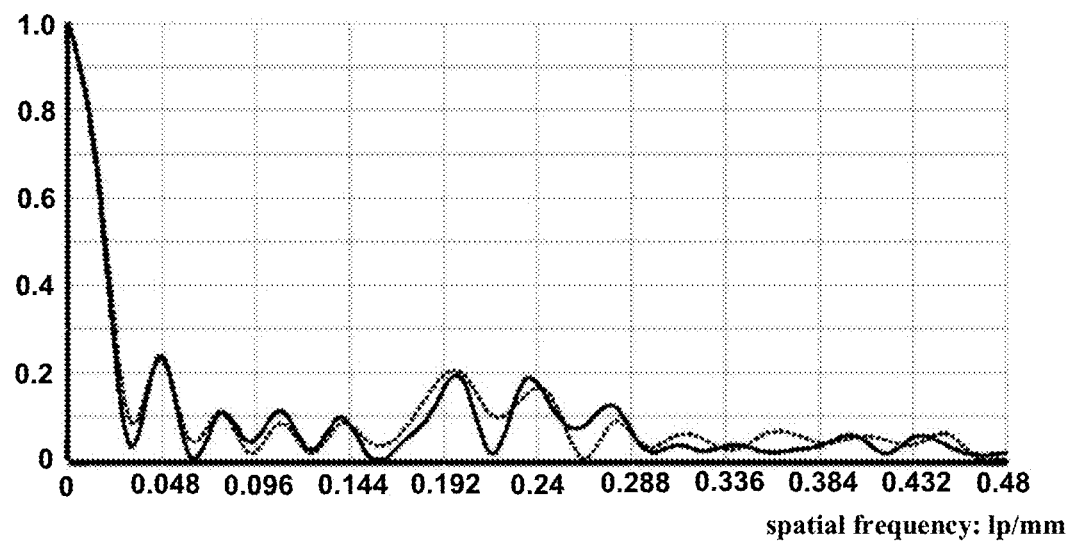
FIG. 4 is an optical simulation result 2 of a Fresnel liquid crystal lens with a six-step shape.
Figure 5:
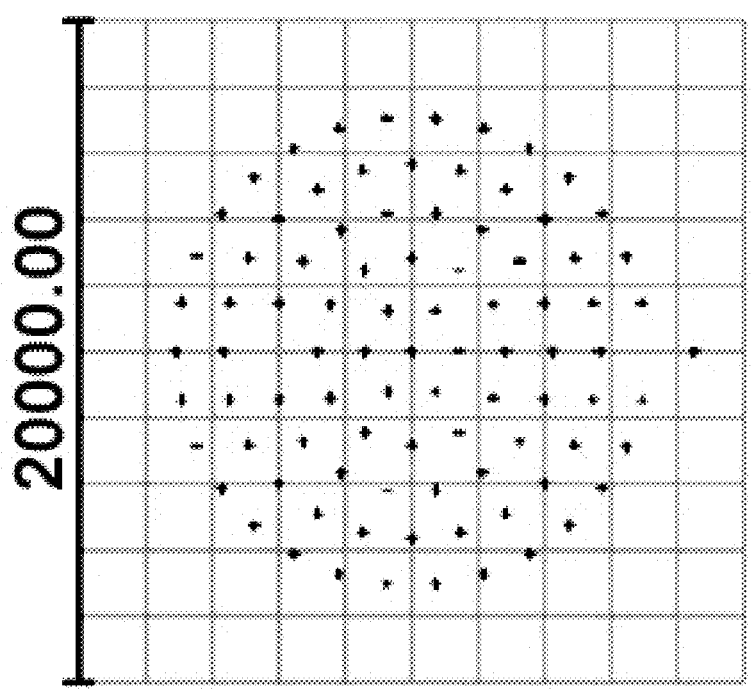
FIG. 5 is an optical simulation result 3 of a Fresnel liquid crystal lens with a six-step shape.
Figure 6:
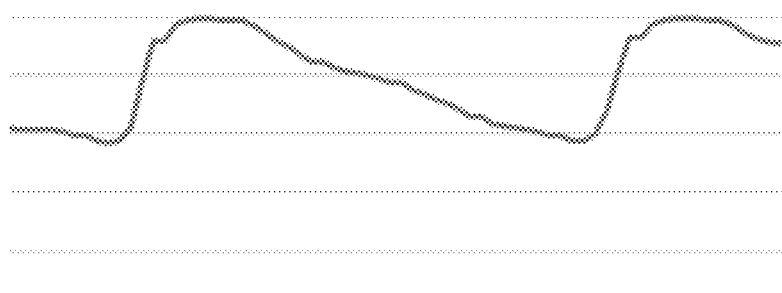
FIG. 6 is a part of morphology of a Fresnel liquid crystal lens in an embodiment of the present disclosure.
Figure 7:
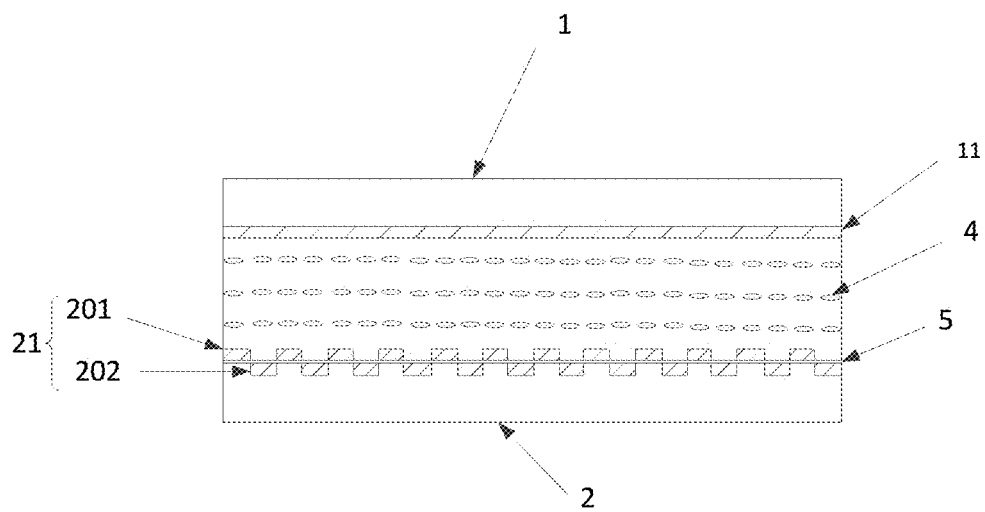
FIG. 7 is a schematic structural diagram of a Fresnel liquid crystal lens in an embodiment of the present disclosure.

However, according to the results of manufacturing and testing, a ghost phenomenon appears when viewing. The ghost phenomenon is caused by stray light in addition to a part of light converging to a designed main focus. As shown in FIG. 1, since the period of the Fresnel lens central region is wider, the Fresnel lens morphology step formed by six electrodes is wider. When the light is incident to a large width of the electrode, the light will exit without being modulated, resulting in stray light. The results of the optical simulations are shown in FIGS. 3-5, wherein FIG. 3 shows light tracing, and FIG. 4 shows imaging quality, wherein the solid line shows the meridional modulation transfer function curve at different viewing angle positions and the dashed line shows the sagittal modulation transfer function curve at different viewing angle positions. FIG. 5 is a dot diagram.

1. The light beams in the central region exit in parallel (as shown in FIG. 3), a focused spot is large, a spot size is 4 mm, and blurred spots generate a ghost blur phenomenon.

2. Poor image quality: MTF≈0.1/0.1 lp/mm, which cannot meet the imaging requirements (where MTF is modulation transfer function, a horizontal axis represents spatial frequency, and a vertical axis represents that the curve of contrast value is an MTF curve, as shown in FIG. 4).

3. Dot diagram: the spot size of 4 mm is large, wherein an RMS radius (root mean square radius) is 5490.79 um and a GEO radius (geometric radius) is 8500.00 um, as shown in FIG. 5.

The results show that the available luminous efficiency is only about 60%; loss of light efficiency is due to: 1. since the morphology efficiency of the six-step fitting to an arc-shaped morphology is only about 80%, and 2. six-electrode equivalent fitting to the ideal refractive index curvature is only about 80%, and thus the available light efficiency is only about 60%.

With regard to the above-mentioned technical problems, this embodiment provides the Fresnel liquid crystal lens structure, and with reference to FIGS. 7-11, the Fresnel liquid crystal lens structure includes a first substrate 1 and a second substrate 2 arranged opposite to each other, and a first electrode 11, a second electrode 21, and a liquid crystal layer 4 arranged between the first substrate 1 and the second substrate 2, the first electrode 11 is a plate-shaped electrode, the second electrode 21 is a plurality of concentric ring electrodes, and the pre-set voltage is applied to the first electrode 11 and the second electrode 21 to deflect liquid crystals to form a Fresnel liquid crystal lens;

the plurality of concentric ring electrodes are divided into a plurality of electrode groups in the first direction (referring to an X direction in FIG. 8) so as to divide the formed Fresnel liquid crystal lens into a plurality of lens regions;

each of the electrode groups is divided into a plurality of sub-electrode groups arranged periodically in the first direction so as to divide each of the lens regions into a plurality of sub-lens regions arranged periodically;

each sub-electrode group includes a plurality of electrodes, so as to form a sub-lens region having a step shape, and the quantities of electrodes in the sub-electrode groups located in different electrode groups are different, so that the quantities of steps of the sub-lens regions located in different lens regions are different;

wherein the first direction is a direction from a center to an edge of the plurality of concentric ring electrodes.

Theoretically, the thinner the electrodes, the more the quantity of electrodes, the more precise the deflection of the liquid crystal can be controlled, and the more accurate the liquid crystal lens can be equivalently fitted with the ideal lens morphology, which will eliminate the stray light to a greater extent.

According to the Fresnel design theory, the period of the Fresnel lens gradually decreases from the center to the edge, i.e., the widths of electrode groups corresponding to different periods gradually decrease from the center to the edge, the central region needs more electrodes to fit a better morphology of the Fresnel liquid crystal lens; in order to improve the quantity of steps in each period (improving the effective light efficiency), in this embodiment, the plurality of concentric ring electrodes are grouped, i.e., divided into the plurality of electrode groups in the first direction (the direction from the center to the edge of the plurality of concentric ring electrodes); the Fresnel liquid crystal lens to be formed is divided into the plurality of lens regions corresponding to the plurality of electrode groups respectively; each electrode group is divided into a plurality of periodically arranged sub-electrode groups; each sub-electrode group includes the plurality of electrodes, so as to form a sub-lens region with the step shape; each lens region includes the plurality of periodically arranged sub-lens regions; and the quantities of electrodes in the sub-electrode groups located in different the electrode groups are different, so that the quantities of steps in the sub-lens regions located in different lens regions are different. As compare with the conventional structure, this is equivalent to enlarging each period of the Fresnel liquid crystal lens, then each period is refined and divided into a plurality of sub-periods again, and the quantity of steps in each sub-period proximate to the center is increased, so as to improve the morphology efficiency of fitting an arc-shaped morphology, fitting a better morphology of a Fresnel lens, thereby improving the light efficiency. FIG. 3 shows the partial morphology of the Fresnel liquid crystal lens fitted in this embodiment. As compared with the partial morphology of the Fresnel liquid crystal lens in FIG. 2, the morphology efficiency of the Fresnel liquid crystal lens fitted in this embodiment is high.

In this embodiment, the width of the plurality of the electrode groups in the first direction gradually increases in the first direction.

Figure 8:
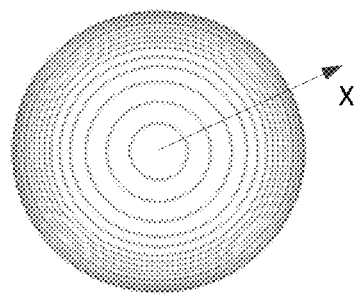
FIG. 8 is a schematic distribution diagram of a second electrode in an embodiment of the present disclosure.
Figure 9:
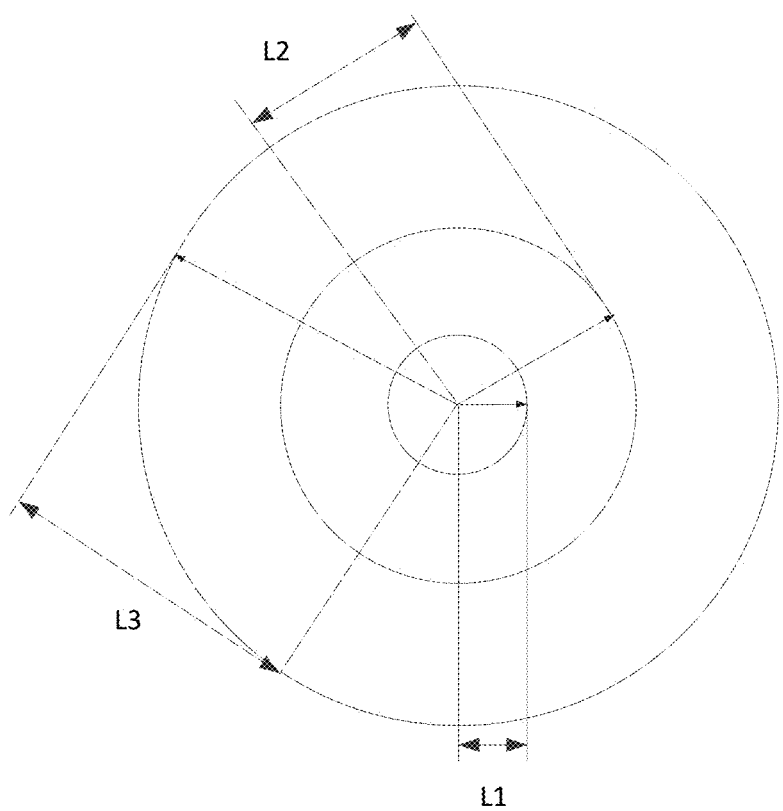
FIG. 9 is a schematic distribution diagram three electrode groups in an embodiment of the present disclosure.

FIG. 8 is the schematic diagram showing the distribution of the plurality of concentric ring electrodes, wherein the portion between two adjacent solid circles in FIG. 8 represents the electrode, and FIG. 9 is the schematic diagram showing group in one implementation of this embodiment, wherein the plurality of concentric ring electrodes are divided into three electrode groups in FIG. 9, the radius of the electrode group in the center is L1, and the widths of the remaining two electrode groups arranged successively from the center to the edge are L2−L1 and L3−L2, respectively, wherein L1<L2−L1<L3−L2, but this is not limited.

It should be noted that one electrode group corresponds to one lens region forming the Fresnel liquid crystal lens. According to the Fresnel lens theory, the width of the period decreases gradually from the center to the edge, and sub-lens regions of different lens regions of the Fresnel liquid crystal lens corresponding to sub-lens groups in different electrode groups gradually decrease in width in the first direction; in some embodiments, the quantities of sub-electrode groups included in different electrode groups sequentially increase in the first direction, i.e., the quantity of sub-lens regions included in different lens regions gradually increases in the first direction; and the quantity of steps contained in the plurality of sub-lens regions in the same lens region is the same, then the widths of the plurality of the electrode groups in the first direction are set according to actual needs, for example, L1=L2−L1.

It should be noted that the first electrode 11 and the second electrode 21 may be arranged on the same substrate, or may be arranged on different substrates. In this embodiment, the first electrode 11 is provided on the first substrate 1, and the second electrode 21 is provided on the second substrate 2, but this is not limited.

In an implementation of this embodiment, the quantity of electrodes in each sub-electrode group in a different electrode group gradually decreases in the first direction, i.e., the quantity of steps in each sub-lens region in a different lens region gradually decreases in the first direction.

In an implementation of this embodiment, the widths of the electrodes of each sub-electrode group in a different one of the electrode groups gradually decrease in in the first direction, i.e., the width of each sub-lens region in a different lens region gradually decreases in the first direction.

In an implementation of this embodiment, the quantities of sub-electrode groups included in different ones of the electrode groups gradually increase in the first direction, i.e., the quantities of sub-lens regions included in different ones of the lens regions gradually increase in the first direction.

In an implementation of this embodiment, the plurality of sub-electrode groups within the same electrode group gradually decrease in width in the first direction, i.e., the plurality of sub-lens regions within the same lens region gradually decrease in width in the first direction.

In an implementation of this embodiment, the plurality of electrodes in the same sub-electrode group have the same width, i.e., the plurality of steps in the same sub-lens region have the same width in the first direction.

Figure 10:
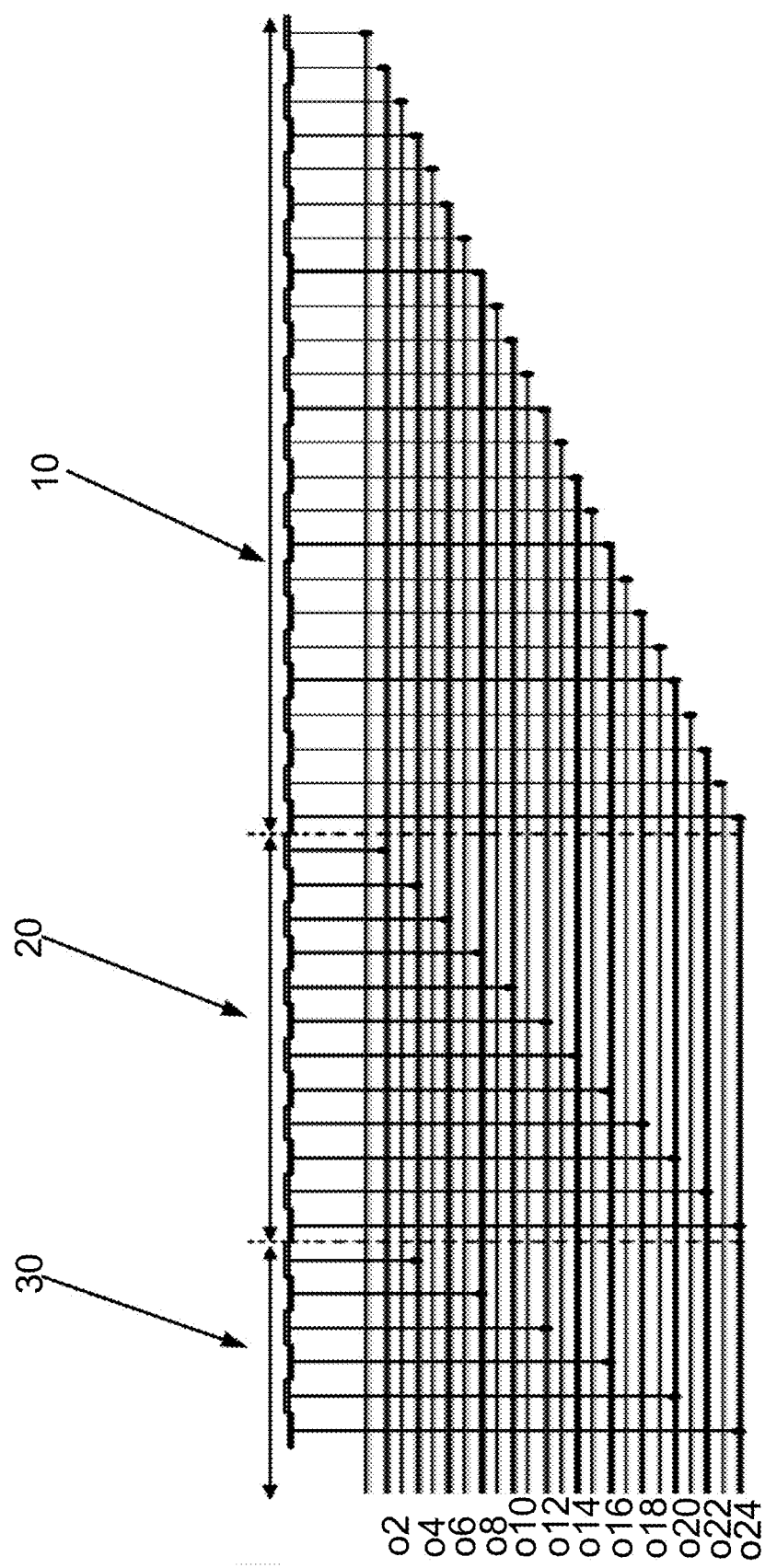
FIG. 10 is a schematic diagram of the connection between electrodes and leads in an embodiment of the present disclosure.
Figure 11:
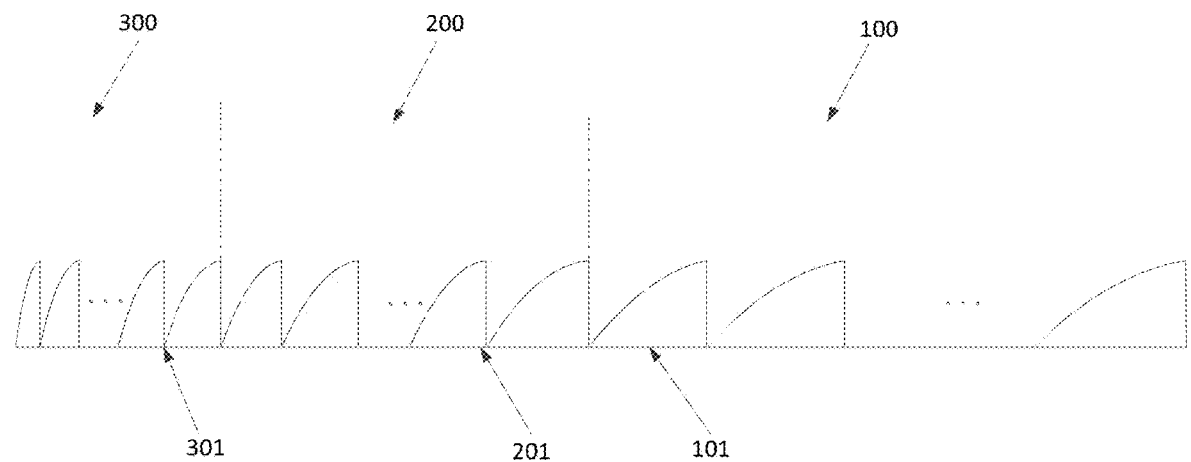
FIG. 11 is a schematic morphology diagram of a Fresnel liquid crystal lens in an embodiment of the present disclosure.

One electrode group corresponds to one lens region forming the Fresnel liquid crystal lens; one sub-electrode group corresponds to the sub-lens region in one lens region; each sub-lens region has the step shape; the width of the lens region proximate to the center in the first direction is large; increasing the quantity of steps of the sub-lens region therein can improve the light efficiency; and the quantity of electrodes in one sub-electrode group corresponds to the quantity of steps of one sub-lens region. According to the Fresnel lens theory, the quantity of electrodes of the sub-electrode groups in the electrode groups proximate to the center in the first direction is large than the quantity of electrodes of the sub-electrode groups in the electrode groups far away from the center, and the quantity of electrodes in each sub-electrode group in different electrode groups decreases gradually in the first direction. With reference to FIGS. 10 and 11, FIG. 10 shows a sub-electrode group in each of three different electrode groups, i.e., the first sub-electrode group 10, the second sub-electrode group 20, and the third sub-electrode group 30 distributed from the center to the edge; in FIG. 10, only one sub-electrode group is shown in each electrode group; FIG. 11 shows three lens regions formed by three different electrode groups distributed from the center to the edge, and the sub-lens region formed by the corresponding sub-electrode group in each lens region, wherein the first lens region 100, the second lens region 200, and the third lens region 300 are shown; and the first lens region includes the plurality of first sub-lens regions 101, the second lens region 200 includes the plurality of second sub-lens regions 201, and the third lens region 300 includes the plurality of third sub-lens regions 301.

Theoretically, the thinner the electrodes, the more the quantity of electrodes, the more precise the deflection of the liquid crystal can be controlled, and the more accurate the liquid crystal lens can be equivalently fitted with the ideal lens morphology, which will eliminate the stray light to a greater extent.

Figure 13:
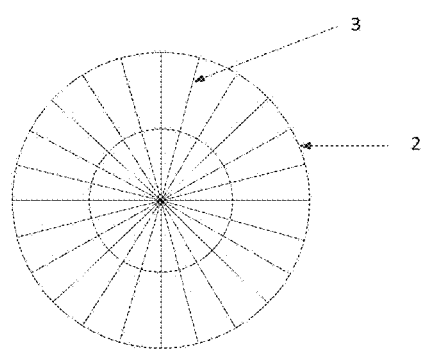
FIG. 13 is a schematic distribution diagram of leads in the related art.

However, the greater the quantity of electrodes, the greater the quantity of leads required. In addition, the leads serve to supply voltage signals to the electrodes, which are arranged radially outwards from the center. Referring to FIG. 13, each lead 3 extends from the center of the concentric ring electrodes 2. Due to the limitations of known technology, the leads are made of opaque metal; thus, the more leads, the lower aperture ratio, resulting in lower transmittance, at the same time, the periphery of the metal leads will affect the liquid crystal deflection, resulting in the stray light phenomenon. As a result, the greater the quantity of leads, the more stray light is produced; therefore, the quantity of metal leads should be limited to ensure transmittance and stray light.

In this embodiment, in order to make the sawtooth morphology of the formed Fresnel liquid crystal lens (the step shape of each sub-lens region) fit well and improve the image quality and reduce the stray light, we increase the quantity of electrodes and make the sawtooth morphology fit well; however, the quantity of leads are also increased accordingly. The leads affect the aperture ratio of the display panel as a whole and reduce the transparency, so the quantity of leads should not be excessive. In order to ensure the transparency to be above 95%, according to the state of the art, a maximum of 24 leads may be provided, so a maximum of 24 voltage leads are arranged in this embodiment.

In order to realize that voltage is applied to three electrode groups through 24 leads, this embodiment adopts a method of sharing leads.

In particular, the plurality of electrode groups include a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further includes a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage.

In this embodiment, the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_{k*m}$.

The quantity of the first leads is m times the quantity of the second leads, where m is greater than or equal to 2, such that the voltages at the electrodes of the respective first sub-electrode group and the voltages at the electrodes of the second sub-electrode group gradually decrease, to comply with the Fresnel lens principle.

Figure 12:
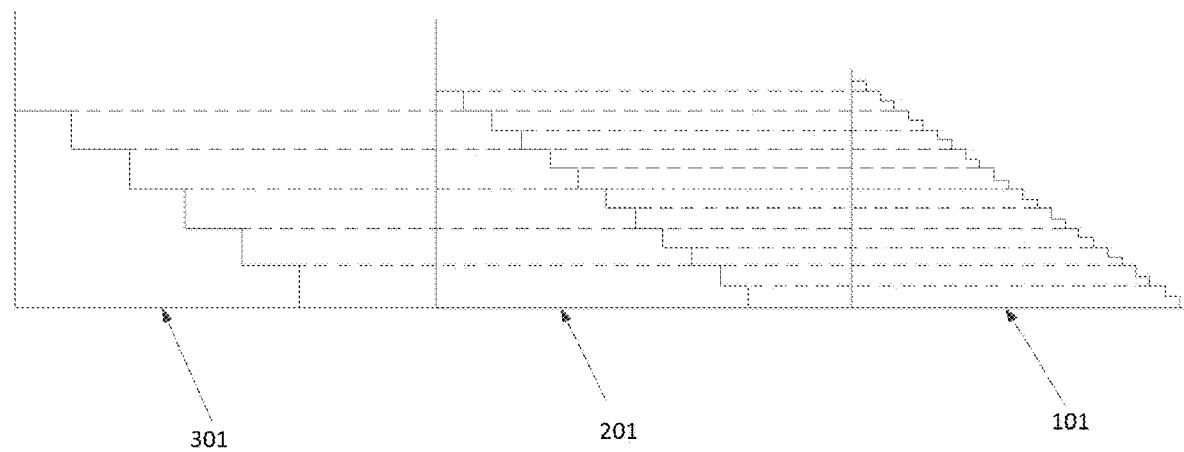
FIG. 12 shows a step shape formed by three electrode groups sharing a voltage in an embodiment of the present disclosure.

With reference to FIG. 10, which shows sub-electrode groups in three different electrode groups, i.e., the first sub-electrode group 10, the second sub-electrode group 20, and the third sub-electrode group 30 distributed from the center to the edge (in FIG. 10, each electrode group only shows one sub-electrode group, which is for illustration purpose only, and the quantity of sub-electrode groups in each electrode group can actually be set according to actual needs). The first sub-electrode group 10 includes 24 concentric ring electrodes, and 24 different voltages o1-o24 are provided for corresponding electrodes; and the 24 voltages are fitted to form the step shape of one sub-lens region of one lens region in the Fresnel liquid crystal lens, as shown in FIG. 12. The reference numeral 101 shows the phase schematic diagram formed by applying the 24 voltages to one sub-electrode group in the first sub-electrode group 10 (i.e., corresponding to the step shape of the sub-lens region in the first sub-electrode group 10).

The second sub-electrode group 20 includes 12 concentric ring electrodes, and 12 voltages V1-V12 are applied, and the 12 voltages are fitted to the step shape of the second sub-lens region 201 shown in FIG. 12, wherein the voltages V1=o2, V2=o4. V12=o24.

The third sub-electrode group 30 includes six concentric ring electrodes, and six voltages V1-V6 are applied to form a step shape of the third sub-lens region 301 as shown in FIG. 12, wherein the voltages V1=V2=o4, V2=V4=o8, V6=V12=o24.

It should be noted that different sub-electrode groups in the same electrode group include the same quantity of electrodes and the same width of electrodes; the different sub-electrode groups in the same electrode group form the same Fresnel lens morphology; the electrodes that are in the different sub-electrode groups in the same electrode group and form steps of the same height have the same voltage; for example, in the first direction, the electrodes contained in the different sub-electrode groups in the same electrode group are numbered, and the voltages applied to the electrodes with the same number are the same; specifically, the above-mentioned plurality of third sub-electrode groups 30 located in the same electrode group are numbered in the first direction, each of the third sub-electrode groups 30 includes electrodes 1-6, and the voltage applied to the electrodes numbered as 1 is the same, and similarly, the voltage applied to the electrodes numbered as 2-6 is the same.

Figure 14:
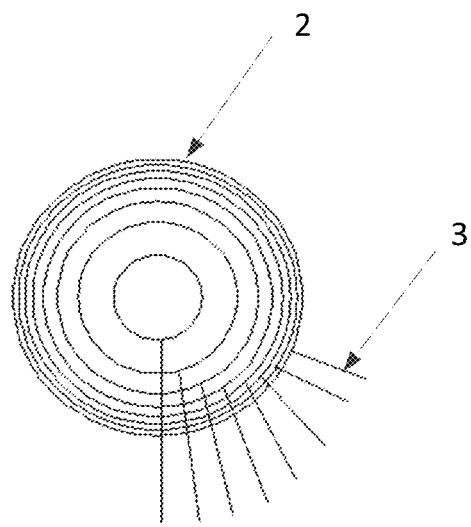
FIG. 14 is a schematic distribution diagram of leads in an embodiment of the present disclosure.

In this embodiment, an end of each of the leads 3 that is adjacent to the center of the concentric ring electrodes is connected to the respective electrode in the sub-electrode group, as shown in FIG. 14.

The function of the leads is to supply voltage signals to the electrodes. FIG. 13 shows the distribution of the leads in the conventional art, which are arranged radially outward from the center, and each lead 3 extends from the center of the concentric ring electrodes 2, regardless of which ring electrode is the starting end of the lead adjacent to the center. Due to the limitations of the known process, the leads are made of opaque metal, and the more leads, the lower the aperture ratio, and the lower the transmittance. In this embodiment, the distribution mode of leads is changed, and the lead is connected to the corresponding electrode at the initial end of one side of the lead adjacent to the center, rather than the center. FIG. 14 shows a schematic diagram of one lead for one electrode, and each lead extends from the position of the connected electrode. For example, with respect to the outer ring electrode located at the outermost side in FIG. 14, the lead connected to the outer ring electrode extends from the outer ring electrode, rather than extending outward from the center, crossing over all the ring electrodes, and being connected with only the corresponding electrode, i.e., the inactive part of the lead between the outer ring electrode and the center is removed as compared with the lead distribution in FIG. 13. In the above-mentioned solution, the lead is arranged according to the electrode arrangement position, and the lead is arranged at the lead-out position, i.e., the lead-out position of the lead is not the center of the concentric ring electrodes, but the electrode proximate to the center, so that the length of the invalid lead is reduced, the aperture ratio is increased, and the stray light is reduced.

In this embodiment, the quantity of electrodes in the sub-electrode groups of the electrode group that is located at the center of the concentric ring electrodes is a maximum quantity of electrodes that is capable of satisfying a preset aperture ratio.

According to the Fresnel theory, the quantities of steps in the sub-lens regions of the central lens region gradually decrease from the center to the edge, and the quantities of steps in the sub-lens regions of the edge lens region correspondingly increase, i.e., the quantity of steps in the sub-lens region of the edge lens region is limited by the quantity of steps in the sub-lens region of the central lens region; therefore, the quantity of electrodes in the sub-electrode group in the electrode group in the center of the concentric ring electrodes is the maximum quantity of electrodes capable of satisfying a preset aperture ratio, so that the light efficiency can be maximally improved.

In this embodiment, in order to make the sawtooth morphology of the formed Fresnel liquid crystal lens (the step shape of each sub-lens region) fit well and improve the image quality and reduce the stray light, it increases the quantity of electrodes and make the sawtooth morphology fit well; however, the quantity of leads are also increased. The leads affect the aperture ratio of the display panel as a whole and reduce the transparency, so the quantity of leads should not be excessive. In order to ensure the transparency above 95%, according to the state of the art, a maximum of 24 leads is available, therefore, 24 voltage leads are arranged in this embodiment, and in an implementation of this embodiment, the maximum quantity of electrodes is 24.

In this embodiment, the quantity of electrodes in the sub-electrode groups of the electrode group that is located at the edge of the plurality of concentric ring electrodes is greater than or equal to a minimum quantity of electrodes that is capable of forming the Fresnel liquid crystal lens topography.

In this embodiment, by arranging the plurality of concentric ring electrodes in groups, i.e., arranging the Fresnel liquid crystal lens to be formed in regions, the quantity of electrodes is increased and the light efficiency is improved; however, the electrode group located at the edge is also to form the morphology of the Fresnel lens, so the quantity of electrodes in the sub-electrode group located in the electrode group at the edge of the plurality of concentric ring electrodes cannot be less than the minimum quantity of electrodes capable of forming the morphology of the Fresnel liquid crystal lens.

It should be noted that the electrode group located at the edge of the plurality of concentric ring electrodes is the electrode group located at the outermost ring.

It should be noted that in this embodiment, the quantity of electrodes in the sub-electrode groups of the electrode group located in the innermost ring can be set according to actual needs, and in this embodiment, the quantity of electrodes in the sub-electrode group of the electrode group located in the innermost ring is 20-36, but this is not limited.

In a specific implementation of this embodiment, 24 leads are provided, and 24 concentric ring electrodes are provided corresponding to the 24 leads, i.e., the sub-electrode group of the sub-lens region forming the central lens region includes 24 electrodes; in addition, in order to improve the aperture ratio, the leads connected to the plurality of electrode groups share the voltage; at the same time, in order to satisfy the principle of gradual decrease of the Fresnel lens, the quantities of the electrodes of the sub-electrode groups in the plurality of electrode groups in the first direction gradually decrease in a multiple relationship, and the multiple of 24 is 12 or 6; therefore, it is preferable in this embodiment, the plurality of concentric ring electrodes are divided into three electrode groups, the quantities of electrodes of sub-electrode groups in different electrode groups in the first direction are 24, 12, and 6 respectively, the Fresnel liquid crystal lens correspondingly formed includes three lens regions, the quantities of steps of sub-lens regions in different lens regions in the first direction are 24, 12, and 6 respectively, the three electrode groups in the first direction are named as a first electrode group, a second electrode group, and a third electrode group, and the corresponding Fresnel liquid crystal lens includes the first lens region, the second lens region, and the third lens region; referring to FIGS. 10-12, the following detailed description is provided.

A first electrode group includes 11 sub-electrode groups in the first direction from a center 0 mm to a position with a radius of 2.1 mm, and a correspondingly formed lens region includes 11 sub-lens regions (the sawtooth structure), wherein each sub-electrode group is composed of 24 concentric ring electrodes, i.e., each sub-lens region is formed by 24 voltages. In the electrode group, there are a total of 11*24=264 concentric ring electrodes, wherein the widths of the electrodes gradually decrease from the center to the edge. The widths of the sub-electrode groups in the electrode group gradually decrease in a range of 627 μm-94 μm (i.e., the width of each electrode gradually decreases in a range of 26 μm-3.9 μm), the width of the sub-electrode group (a central electrode group) proximate to the center is between 627 μm-200 μm in the first direction, and the width of the electrode group adjacent to the central electrode group is between 199 μm-350 μm, so that the 24 voltages are used to fit the aspheric arc-shaped morphology, so that the light in the central area aggregates at the main focus. The width of the remaining sub-electrode group in the first direction is between 186 μm and 94 μm, the 24 voltage fits are used to form the ideal arc-shaped morphology, so that the effective efficiency is greatly improved to 98%, and the stray light is greatly reduced.

A second electrode group includes 33 sub-electrode groups in the first direction from 2.1 mm in the center to a position with a radius of 4.2 mm, and the correspondingly formed lens region includes 33 sub-lens regions (the sawtooth structure), i.e., from 12 periods to 45 periods. The simulation result shows that 12 electrodes can be used to fit the arc-shaped morphology of the Fresnel lens, i.e., each sub-electrode group is composed of the 12 concentric ring electrodes, i.e., each sub-lens region is formed by 12 voltages, and there are 33*12=396 concentric ring electrodes in total. However, in order to reduce the quantity of the electrode leads, the voltage is applied without increasing the electrode leads, and the voltage design scheme of sharing the first electrode group is adopted. The phase implementation is shown in FIG. 12, wherein O1-O24 represents a phase equivalent schematic diagrams after 24 voltages of the first electrode group are applied, and V1-V12 represents a phase equivalent schematic diagram formed by 12 voltages used by the second electrode group; it can be seen that the second electrode group uses 12 voltages in the first electrode group so as to realize a 12-step phase of the sub-lens region corresponding to the sub-electrode group of the second electrode group, and it can be seen from the optical simulation result that the sub-lens region which can be formed by 12 voltages is the arc-shaped morphology having the wavelength difference of λ, wherein the width of the electrodes gradually decreases from the center to the edge. The widths of the sub-electrode groups in the first direction gradually decreases (i.e., the width of the electrode gradually decreases in the range of 7.8 μm to 3.9 μm) within the range of 94 μm to 47 μm, and the effective efficiency increases to 98%.

A third sub-electrode group includes 132 sub-electrode groups in the first direction from a central 4.2 mm to a radial 8.35 mm position, i.e., from 46 periods to 178 periods. There are a total of 132*6=792 concentric ring electrodes, wherein the width of the electrode gradually decreases from the center to the edge. The widths of the sub-electrode groups gradually decrease within the range of 47 μm-24 μm (i.e., the widths of the electrodes gradually decrease within the range of 7.8 μm-4 μm), and it is obtained through simulation that the arc-shaped morphology of the Fresnel lens can be fitted by using six electrodes in the width range; however, in order to reduce the quantity of the electrode leads, voltage is applied without increasing the quantity of electrode leads, and the voltage design scheme sharing the first electrode group is used; the phase implementation is shown in FIG. 12, wherein O1-O24 represent a phase equivalent schematic diagram after 24 voltages of the first electrode group are applied, and V1-V12 represents a phase equivalent schematic diagram formed by six voltages used by the third electrode group; it can be seen that the third electrode group uses six voltages in the first electrode group to realize the six-step phase of the sub-lens region corresponding to the sub-electrode group in the third electrode group, and it can be seen from the optical simulation result that the 12 voltages can form the sub-lens region with the arc-shaped morphology with the phase difference of λ wavelength, and the effective efficiency thereof is improved by about 20%, and can be improved to 98%, and the stray light is greatly reduced.

Figure 15:
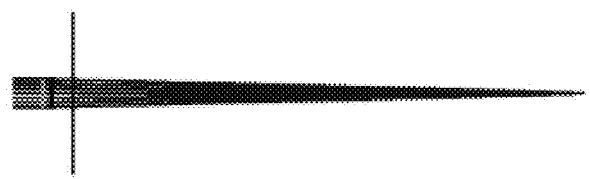
FIG. 15 is an optical simulation result 1 of a Fresnel liquid crystal lens in an embodiment of the present disclosure.
Figure 16:
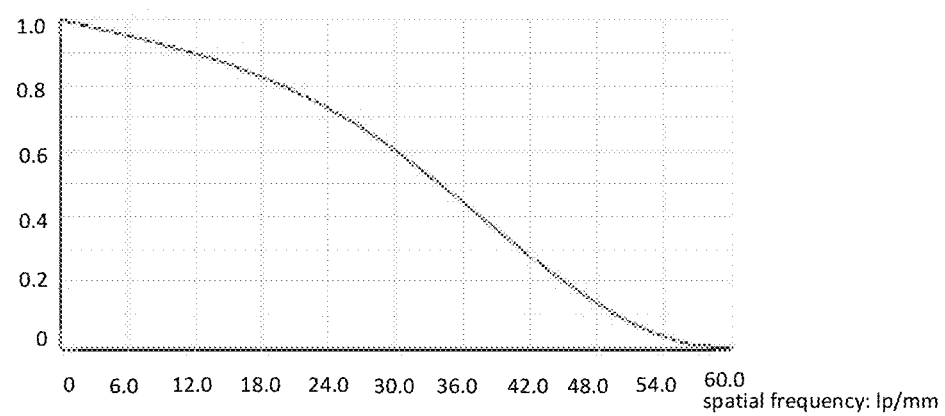
FIG. 16 is an optical simulation result 2 of a Fresnel liquid crystal lens in an embodiment of the present disclosure.
Figure 17:
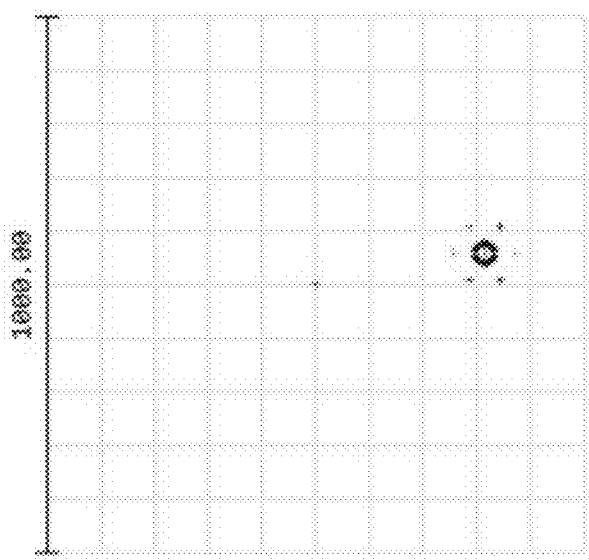
FIG. 17 is an optical simulation result 3 of a Fresnel liquid crystal lens in an embodiment of the present disclosure.

The result of the optical simulation of the Fresnel liquid crystal lens structure in this embodiment is as follows. With reference to FIGS. 15-17, wherein FIG. 15 shows light tracing, FIG. 16 shows imaging quality, wherein the meridional and sagittal modulation transfer function curves at different viewing angle positions coincide, and FIG. 17 shows a dot diagram.

1. The light is well focused, the focused spot is small, the spot size is 0.4 mm, and the phenomenon of blurred large spot phenomenon does not occur.

2. Good image quality: MTF≥0.2/45 lp/mm, which can meet the general system requirements such as Virtual Reality (VR)/Augmented Reality (AR), detection sensing, mobile phone lens.

3. The dot diagram: spot size is 0.4 mm, wherein the RMS radius (root mean square radius) is 320.119 μm and the GEO radius (geometric radius) is 377.585 μm.

In this embodiment, the plurality of concentric ring electrodes are arranged in two layers in the direction perpendicular to the second substrate 2, i.e., the plurality of concentric ring electrodes include the first layer electrode 201 and the second layer electrode 202, an insulating layer 5 is arranged between the first layer electrode 201 and the second layer electrode 202, and the electrodes located in different layers are staggered to prevent a short circuit between adjacent electrodes.

In this embodiment, the electrode is an Indium Tin Oxide (ITO) electrode, but this is not limited.

This embodiment also provides a display device including the Fresnel liquid crystal lens structure described above.

The embodiments of the present disclosure also provide a method for driving the Fresnel liquid crystal lens, wherein a Fresnel liquid crystal lens structure includes a first substrate, a second substrate, a first electrode, a second electrode, and a liquid crystal layer, wherein the first substrate and the second substrate are arranged opposite to each other, and the first electrode, the second electrode, and the liquid crystal layer are located between the first substrate and the second substrate, the first electrode is a plate-shaped electrode, the second electrode is a plurality of concentric ring electrodes, and a pre-set voltage is applied to the first electrode and the second electrode to deflect liquid crystals to form the Fresnel liquid crystal lens; the plurality of concentric ring electrodes is divided into a plurality of electrode groups in a first direction, to divide the formed Fresnel liquid crystal lens into a plurality of lens regions; each of the electrode groups is divided in the first direction into a plurality of sub-electrode groups arranged periodically, to divide each of the lens regions into a plurality of sub-lens regions arranged periodically; and each of the sub-electrode groups includes a plurality of electrodes, to form a sub-lens region having a step shape, and a respective quantity of electrodes in each of the sub-electrode groups located in any one of the electrode groups is different, to enable that a respective quantity of steps in each of the sub-lens regions located in any one of the lens regions is different; wherein the first direction is a direction from a center to an edge of the plurality of concentric ring electrodes;

the method includes: providing the plurality of electrodes in each of the sub-electrode groups with respective different voltages, to deflect the liquid crystals at different angles to form the sub-lens region having the step shape.

In this embodiment, the plurality of electrode groups include a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further includes a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage;

wherein the method further includes: providing, through the first leads, the plurality of electrodes in the first sub-electrode group with respective different voltages, and providing, through the second leads, the plurality of electrodes in the second sub-electrode group with voltages that are same as the voltages at the first leads arranged at the preset positions, respectively.

In this embodiment, the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_{k*m}$, wherein providing, through the second leads, the plurality of electrodes in the second sub-electrode group with the voltages that are same as the voltages at the first leads arranged at the preset positions, respectively, includes: providing, through the $k^{th}$ second lead, the electrode that is in the second sub-electrode group and numbered as $b_k$ with the same voltage as the voltage at the $(k*m)^{th}$ first lead.

The above are the preferred embodiments of the present disclosure. It should be noted that a person skilled in the art may implement various improvements and modifications without departing from the principles of the present disclosure, and theses improvement and modifications shall fall within the scope of protection of the present disclosure.

What is claimed is:

1. A Fresnel liquid crystal lens structure, comprising a first substrate, a second substrate, a first electrode, a second electrode, and a liquid crystal layer, wherein the first substrate and the second substrate are arranged opposite to each other, and the first electrode, the second electrode, and the liquid crystal layer are located between the first substrate and the second substrate, the first electrode is a plate-shaped electrode, the second electrode is a plurality of concentric ring electrodes, and a pre-set voltage is applied to the first electrode and the second electrode to deflect liquid crystals to form a Fresnel liquid crystal lens;

the plurality of concentric ring electrodes is divided into a plurality of electrode groups in a first direction, to divide the formed Fresnel liquid crystal lens into a plurality of lens regions;

each of the electrode groups is divided in the first direction into a plurality of sub-electrode groups arranged periodically, to divide each of the lens regions into a plurality of sub-lens regions arranged periodically; and each of the sub-electrode groups comprises a plurality of electrodes, to form a sub-lens region having a step shape, and a respective quantity of electrodes in each of the sub-electrode groups located in any one of the electrode groups is different, to enable that a respective quantity of steps in each of the sub-lens regions located in any one of the lens regions is different;

wherein the first direction is a direction from a center to an edge of the plurality of concentric ring electrodes;

a respective quantity of sub-electrode groups comprised in each of different electrode groups gradually increases in the first direction, to enable that in a respective quantity of sub-lens regions within each of different lens regions gradually increases in the first direction;

in the first direction, the plurality of electrode groups comprise a first electrode group, a second electrode group, and a third electrode group arranged sequentially in that order, wherein a sum of a quantity of sub-electrode groups comprised in the first electrode group and a quantity of sub-electrode groups comprised in the second electrode group is less than a quantity of sub-electrode groups comprised in the third electrode group;

a width of each of the electrodes in the same sub-electrode group is same.

2. The Fresnel liquid crystal lens structure according to claim 1, wherein a respective width of each of the electrode groups in the first direction gradually increases in the first direction.

3. The Fresnel liquid crystal lens structure according to claim 1, wherein the respective quantity of electrodes in each of the sub-electrode groups located in the electrode group gradually decreases in the first direction.

4. The Fresnel liquid crystal lens structure according to claim 1, wherein the plurality of electrode groups comprise a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further comprises a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage.

5. The Fresnel liquid crystal lens structure according to claim 4, wherein the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_k*m$.

6. The Fresnel liquid crystal lens structure according to claim 4, wherein an end of each of the leads that is adjacent to the center of the concentric ring electrodes is connected to the respective electrode in the sub-electrode group.

7. The Fresnel liquid crystal lens structure according to claim 1, wherein the quantity of electrodes in the sub-electrode groups of the electrode group that is located at the center of the concentric ring electrodes is a maximum quantity of electrodes that is capable of satisfying a preset aperture ratio.

8. The Fresnel liquid crystal lens structure according to claim 1, wherein the quantity of electrodes in the sub-electrode groups of the electrode group that is located at the edge of the plurality of concentric ring electrodes is greater than or equal to a minimum quantity of electrodes that is capable of forming the Fresnel liquid crystal lens topography.

9. The Fresnel liquid crystal lens structure according to claim 1, wherein the quantity of electrodes in each of the sub-electrode groups of the same electrode group is same.

10. The Fresnel liquid crystal lens structure according to claim 1, wherein the respective widths of the electrodes in different sub-electrode groups in the same electrode group gradually decreases in the first direction.

11. A display device, comprising the Fresnel liquid crystal lens structure according to claim 1.

12. The display device according to claim 11, wherein a respective width of each of the electrode groups in the first direction gradually increases in the first direction.

13. The display device according to claim 11, wherein the respective quantity of electrodes in each of the sub-electrode groups located in the electrode group gradually decreases in the first direction.

14. The display device according to claim 11, wherein the plurality of electrode groups comprise a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further comprises a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage.

15. The display device according to claim 14, wherein the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_{k*m}$.

16. The display device according to claim 14, wherein an end of each of the leads that is adjacent to the center of the concentric ring electrodes is connected to the respective electrode in the sub-electrode group.

17. The display device according to claim 11, wherein the quantity of electrodes in the sub-electrode groups of the electrode group that is located at the center of the concentric ring electrodes is a maximum quantity of electrodes that is capable of satisfying a preset aperture ratio.

18. A method for driving a Fresnel liquid crystal lens, wherein a Fresnel liquid crystal lens structure comprises a first substrate, a second substrate, a first electrode, a second electrode, and a liquid crystal layer, wherein the first substrate and the second substrate are arranged opposite to each other, and the first electrode, the second electrode, and the liquid crystal layer are located between the first substrate and the second substrate, the first electrode is a plate-shaped electrode, the second electrode is a plurality of concentric ring electrodes, and a pre-set voltage is applied to the first electrode and the second electrode to deflect liquid crystals to form the Fresnel liquid crystal lens; the plurality of concentric ring electrodes is divided into a plurality of electrode groups in a first direction, to divide the formed Fresnel liquid crystal lens into a plurality of lens regions; each of the electrode groups is divided in the first direction into a plurality of sub-electrode groups arranged periodically, to divide each of the lens regions into a plurality of sub-lens regions arranged periodically; and each of the sub-electrode groups comprises a plurality of electrodes, to form a sub-lens region having a step shape, and a respective quantity of electrodes in each of the sub-electrode groups located in any one of the electrode groups is different, to enable that a respective quantity of steps in each of the sub-lens regions located in any one of the lens regions is different; wherein the first direction is a direction from a center to an edge of the plurality of concentric ring electrodes; a respective quantity of sub-electrode groups comprised in each of different electrode groups gradually increases in the first direction, to enable that in a respective quantity of sub-lens regions within each of different lens regions gradually increases in the first direction; in the first direction, the plurality of electrode groups comprise a first electrode group, a second electrode group, and a third electrode group arranged sequentially in that order, wherein a sum of a quantity of sub-electrode groups comprised in the first electrode group and a quantity of sub-electrode groups comprised in the second electrode group is less than a quantity of sub-electrode groups comprised in the third electrode group; wherein a width of each of the electrodes in the same sub-electrode group is same;

the method comprises: providing the plurality of electrodes in each of the sub-electrode groups with respective different voltages, to deflect the liquid crystals at different angles to form the sub-lens region having the step shape.

19. The method according to claim 18, wherein the plurality of electrode groups comprise a first electrode group, sub-electrode groups in the first electrode group are first sub-electrode groups, an electrode group adjacent to the first electrode group and distal to the center of the concentric ring electrodes is a second electrode group, and sub-electrode groups in the second electrode group are second sub-electrode groups;

the Fresnel liquid crystal lens structure further comprises a plurality of leads that is connected to the plurality of concentric ring electrodes to provide voltages, wherein the leads connected respectively to the electrodes in the first sub-electrode group are first leads, the leads connected respectively to the electrodes in the second sub-electrode group are second leads, and each of the second leads is connected to a first lead of the plurality of the first leads that is arranged at a preset position, to share a same voltage;

wherein the method further comprises: providing, through the first leads, the plurality of electrodes in the first sub-electrode group with respective different voltages, and providing, through the second leads, the plurality of electrodes in the second sub-electrode group with voltages that are same as the voltages at the first leads arranged at the preset positions, respectively.

20. The method according to claim 19, wherein the electrodes in the first sub-electrode group in the first direction are numbered respectively as $a_1, a_2, \ldots, a_n$, the electrodes in the second sub-electrode group in the first direction are numbered respectively as $b_1, b_2, \ldots, b_k$, the quantity of the electrodes in the first sub-electrode group is m times the quantity of the electrodes in the second sub-electrode group, and the quantity of the first leads is m times the quantity of the second leads, wherein a $k^{th}$ one of the second leads and a $(k*m)^{th}$ one of the first leads are connected to share the same voltage, wherein the $k^{th}$ second lead is connected correspondingly to the electrode that is in the second sub-electrode group and numbered as $b_k$, and the $(k*m)^{th}$ first lead is connected correspondingly to the electrode that is in the first sub-electrode group and numbered as $a_{k*m}$, wherein providing, through the second leads, the plurality of electrodes in the second sub-electrode group with the voltages that are same as the voltages at the first leads arranged at the preset positions, respectively, comprises:

providing, through the $k^{th}$ second lead, the electrode that is in the second sub-electrode group and numbered as $b_k$ with the same voltage as the voltage at the $(k*m)^{th}$ first lead.

* * * * *